United States Patent [19]

Kidowaki et al.

[11] Patent Number: 4,465,119
[45] Date of Patent: Aug. 14, 1984

[54] METHOD AND APPARATUS FOR CONTROLLING CURRENT LEVEL IN ARC DISCHARGE MELTING OF MATERIAL TO BE PRECISION CAST

[76] Inventors: Yoshimasa Kidowaki, c/o Iwatani Sangyo, Kabushiki Kaisha - 1,4 chome, Hommachi, Higashiku, Osaka; Akira Yonemoto, 13-10 8 chome, Okamoto, Higashinadaku, Kobe, Hyogoken, both of Japan

[21] Appl. No.: 298,328

[22] Filed: Sep. 1, 1981

[30] Foreign Application Priority Data

May 21, 1981 [JP] Japan .................................. 56-77468

[51] Int. Cl.³ ........................ B22D 46/00; B22D 27/02
[52] U.S. Cl. .................................... 164/457; 164/495; 164/514
[58] Field of Search ............... 164/155, 457, 495, 496, 164/497, 508, 509, 514, 515; 323/237, 239, 242

[56] References Cited

U.S. PATENT DOCUMENTS

| 3,410,946 | 11/1968 | Dilling et al. ........................ 164/495 |
| 3,767,831 | 10/1973 | Plockinger et al. ............ 164/515 X |
| 4,036,278 | 7/1977 | Ramacciotti ........................ 164/497 |
| 4,207,516 | 6/1980 | Babcock ........................ 323/242 X |
| 4,254,817 | 3/1981 | Kidowaki et al. . |
| 4,357,706 | 11/1982 | Kidowaki . |

FOREIGN PATENT DOCUMENTS 256797  11/1969  U.S.S.R. .............................. 164/497

Primary Examiner—Gus T. Hampilos
Assistant Examiner—Jerold L. Johnson

[57] ABSTRACT

A method for casting material melted by arc discharge and an arc melting apparatus useful with a precision casting machine, the invention is practiced by initiation of an arc discharge at an arc current lower than the steady state current normally used for arc melting, thereby to prevent starting shock. Current level is subsequently increased in a rapid and regular manner to a steady state current for melting in a stable manner the material which is to be cast. The apparatus of the invention includes a small and compact arc power source provided with apparatus for controlling the arc current which is applied to the material to be melted. When utilized with a precision casting apparatus, the invention improves the manufacture of artificial teeth, accessories, industrial mechanical parts and the like.

6 Claims, 9 Drawing Figures

FIG.1
FIG.3
FIG.2
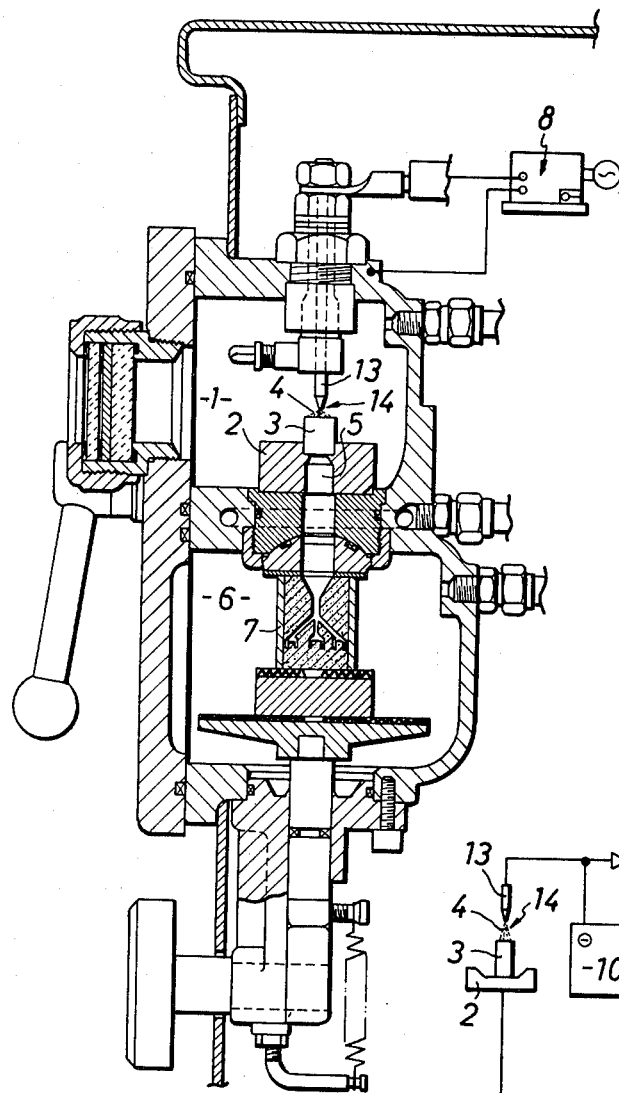
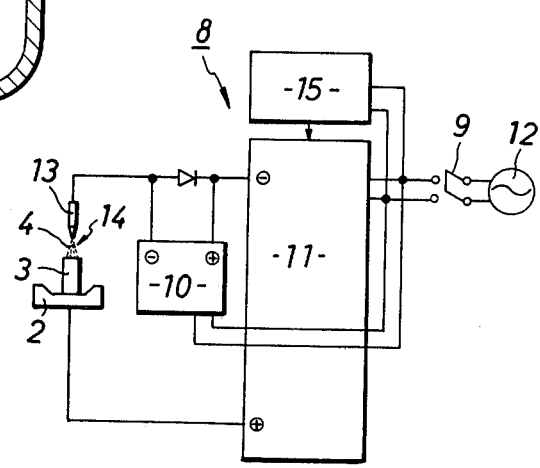
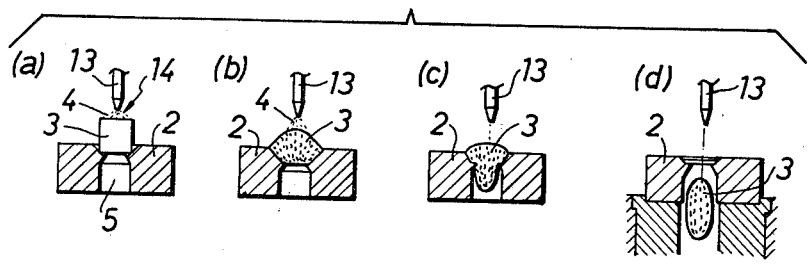

METHOD AND APPARATUS FOR CONTROLLING CURRENT LEVEL IN ARC DISCHARGE MELTING OF MATERIAL TO BE PRECISION CAST

BACKGROUND OF THE INVENTION

1. Field of the Invention

The invention relates generally to precision casting of molten material by means of methods and apparatus useful in the manufacture of artificial teeth, industrial mechanical parts and the like. The invention relates particularly to a method and apparatus for controlling current level in the arc discharge melting of material which is to be cast.

2. Description of the Prior Art

In the practice of precision casting, a material to be cast must be first melted, a common practice in the art being to melt such material by means of an arc discharge applied to the material. While arc discharge melting has a number of advantages, a problem typically encountered in this mode of melting is the stabilization of the arc discharge, it being difficult using prior art methods and arc discharge apparatus to stabilize the discharge due to the inability to stabilize the applied current. In conventional arc discharge melting devices which are presently available, arc discharge is at least partially stabilized by utilizing an arc power device which operates at a voltage which is approximately three times as great as the voltage necessary for arc discharge, the voltage then being reduced with a series of resistances or inductances. However, the use of substantially higher voltage levels than are necessary does not result in complete stabilization of the arc, it also not being possible with such prior art methods and apparatus to decrease electric input. Further, the high voltage levels required in such prior art methods necessitate the use of arc power apparatus of extremely high capacity, thereby increasing the expense of the total process. While an arc discharge can be more completely stabilized as arc power apparatus of increasingly higher voltages are utilized, the pursuit of such a solution to the problem is impractical due to the expense of the apparatus and the increasing size thereof.

The prior art also encompasses other methods and apparatus for stabilizing an arc, including the detection of arc current and subsequent adjustment of the alternating current of the applied input power by means of a thyristor. In this method and apparatus for arc current stabilization, the thyristor is "on" when an arc is started, thereby resulting at the instant of arc initiation in a flow of "over" arc current. The thyristor controls striking timing by detection of this over current. However, due to the transient over current, molten casting metal is caused to be vaporized and spattered with a strong potential for damage to the arc power circuit due to the shock thus resulting. As a consequence of this shock, the wave of the alternating current from the power input is disturbed and the resulting asymmetrical current flows in the primary coil of the power input transformer to cause a deviated magnetization such as would be caused by a direct current flowing in the primary coil. As a result, magnetizing control is broken at the peak voltage and a run away current is generated. In prior apparatus of this type, even the temporary generation of a run away current results in severe damage to the primary coil of the power input transformer and to the thyristor itself. Attempts to improve this thyristor apparatus have included the provision of a thyristor on a circuit more near the arc, the thyristor normally being on the dropping transformer. However, such a practice requires the use of large and extremely expensive thyristors due to the flow of large current levels in circuitry near the arc due to the large drops in voltage which are experienced. Further, thermal losses with such an arrangement are experienced and the use of a radiator is necessary for protection of the apparatus. As a further negative consequence, the total efficiency of the arc power device is lessened, thereby requiring an increase in the power necessary for striking an arc signal of the thyristor. An arc current control device utilized in such an environment must also be of large capacity.

The present invention intends solution to the problems encountered in the art as evidenced above through use of a method and apparatus capable of initiating arc current at a first lower level and rapidly and smoothly increasing the arc current level up to the steady higher current necessary for melting. The current level is increased immediately after starting of the lower current arc discharge to the steady higher current, this process preventing the occurrence of starting shock. The invention thus makes possible the generation of a stable arc discharge for melting casting materials smoothly through the use of a small and relatively compact direct current generating source.

SUMMARY OF THE INVENTION

The present invention provides a method and apparatus for controlling the current to an arc discharge to allow melting of the material which is to be cast, the melting being thereby smoothly and stably accomplished without starting shock. The apparatus utilized according to the invention is relatively small and compact when compared to prior art apparatus, the arc discharge apparatus and associated power receiving devices of the invention being of a manageably small size and of a reasonable cost. The arc current control apparatus of the invention acts according to the method of the invention to control the value of the current charged to an arc gap of an arc discharge apparatus, the arc discharge being thereby initiated stably to melt the material which is to be cast both smoothly and with stability through the use of a relatively small and compact arc power source operable at relatively low voltages which are essentially equal to 1.5 times the arc voltage. Since the value of the current charged to the arc gap is initially small relative to the steady state current level and since the current is increased after low current initiation in a rapid and smooth manner to the steady state current level, a transient over current is avoided. Therefore, inadvertent damage to control and power input circuitry and to the arc power source itself due to vaporization and spattering of casting material such as occurs with conventional apparatus is avoided. Casting material is therefore more readily and efficiently melted and the longevity of the arc melting apparatus is increased.

The invention also contemplates the disposition of a thyristor more near an alternating power source of the apparatus than on a dropping transformer thereof, the thyristor acting to control arc current and allowing, in this conformation, simplification of the electric circuitry for current control. In this conformation, relatively small thyristors can be utilized due to the necessity only for relatively small currents, thermal and power losses also being minimized and energy efficiency increased through utilization of the present invention. The advantages so provided allow improvement of casting running cost. As a further advantage, the utilization of relatively small thyristors allows the arc current control apparatus of the invention to be of a small capacity and thus compact in size.

According to the method of the invention, casting material is melted in a melting chamber of a precision casting apparatus, the casting material being contained therein at the entrance of a melting pot with an electrode located opposite the casting material. An arc discharge is generated in the gap between the electrode and the casting material by supplying to the electrode a direct current, the casting material being thereby melted by the arc discharge. Initiation of the arc occurs by control of the electric current charged to the arc gap from the arc power apparatus, this current being relatively small on starting of the arc discharge with current levels being increased rapidly and smoothly to a certain steady current, the steady current being maintained to accomplish melting of the casting material with the advantages described herein.

It is therefore a primary object of the invention to provide an arc melting apparatus useful with a precision casting apparatus, a casting material disposed at the entrance of a melting pot of the precision casting apparatus being arc melted by means of an electrode located opposite the casting material and supplied with current from an arc power source controlled by an arc current control apparatus, the arc power source generating an arc discharge in an arc gap between the casting material and the electrode by charging of direct current, thereby to melt the casting material by means of the arc discharge.

It is another object of the invention to provide a method and apparatus for arc melting and including an arc current instruction circuit connected to a constant voltage circuit through a rapidly increasing voltage circuit, the arc current control apparatus acting to control current charged to the arc gap of the arc melting apparatus, the rapidly increasing voltage circuit including a division condenser to provide a relatively small current for initiation of arc discharge and a division resistance to provide a relatively larger current for a steady arc discharge, the division condenser and division resistance being connected in parallel with the constant voltage circuit.

It is a further object of the invention to provide control apparatus for an arc melting apparatus and including an arc current instruction circuit as aforesaid wherein the dividing ratio of the division condenser is taken to be smaller than the dividing ratio of the division resistance, the dividing point of the division resistance being connected with the dividing point of the division condenser through a resistance, the arc current instruction circuit being connected with the dividing point of the division condenser through a resistance.

Further objects and advantages of the invention will become more readily apparent in light of the following detailed description of the preferred embodiments of the invention.

BRIEF DESCRIPTION OF THE DRAWINGS

FIG. 1 is a side elevational view in partial section of the melting and casting chambers of a precision casting apparatus;

FIGS. 2A, B, C and D are schematic views of an arc discharge melting process respectively illustrating each melting state from melting initiation to casting initiation;

FIG. 3 is a block diagram of the general electrical circuitry of the arc melting apparatus;

DETAILED DESCRIPTION OF THE PREFERRED EMBODIMENT

Figure 4:
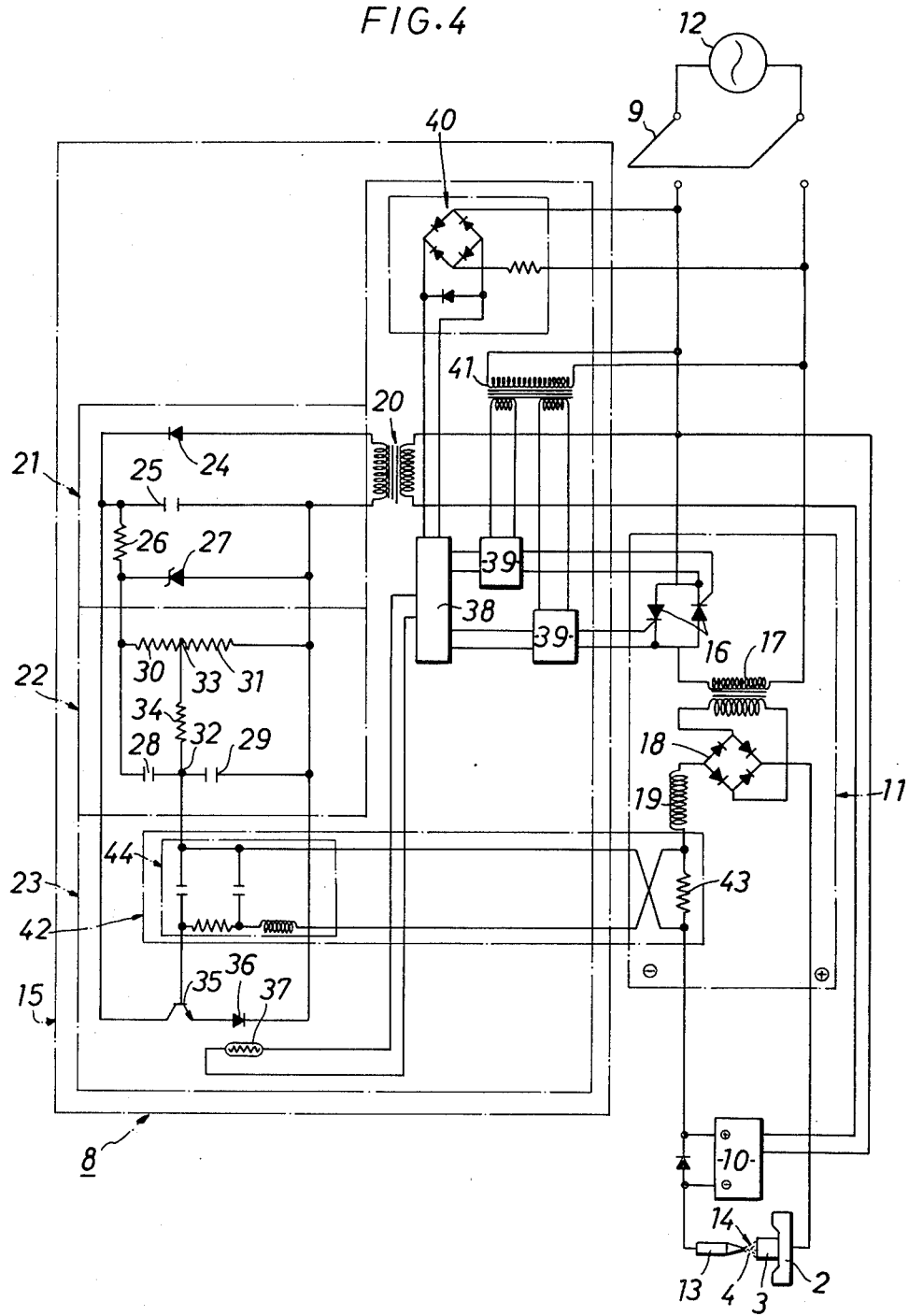
FIG. 4 is a detailed block diagram of the electrical circuitry of FIG. 3.

Referring now to the drawings, and particularly to FIG. 1, melting and casting chambers of a precision casting machine are seen to comprise a melting chamber 1 having a body of casting material 3 located at the entrance of a melting pot 2, the casting material 3 being melted by an arc discharge at 4 as is sequentially illustrated in FIGS. 2a–d. On melting of all of the casting material 3, bottom hole 5 of the melting pot 2 is opened completely to cause the molten casting material to flow downwardly into mold 7 located in casting chamber 6. The structure and methodology thus described is considered to be conventional in the art.

Referring now to FIG. 3, a fundamental electric circuit of arc melting apparatus 8 is illustrated. Operation of start switch 9 initiates operation of arc starting device 10 and arc power device 11 by virtue of energy supply thereto from electric power source 12. The arc starting device 10 has a high voltage direct current output which initiates an arc discharge in arc gap 14 between casting material 3 and electrode 13 through the arc power device 11 and the melting pot 2. A current path including ionized gases is thus completed by initiation of the arc and a steady arc represented at 4 is to be generated in the arc gap 14. The arc power device 11 has a low voltage direct current output intended to maintain the arc discharge 4 for a certain period of time such that the casting material 3 can be completely melted. According to the present invention, output current is controlled by an arc control device shown at 15 in FIG. 3 which allows output current to be increased speedily and smoothly from an initial low value as is graphically represented in FIG. 5.

Referring now to FIG. 4, detailed electrical circuitry corresponding to the diagrammatical circuit of FIG. 3 is shown. Considering first the operation of the arc power device 11, it is seen that alternating current is supplied to the device 11 from the power source 12, the supply of power being controlled by a thyristor 16 and the voltage of the supply power is reduced by a dropping transformer or step-down transformer 17. The alternating current is then transformed by a full wave rectification circuit 18 into a direct current which is directed through a reactor 19 for stabilization of the current.

Figures 5, 6:
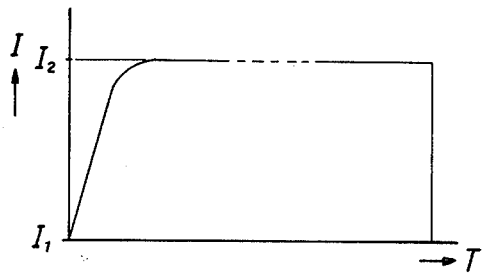
FIG. 5 is a diagrammatic representation of the current supplied to an arc gap from an arc power source plotted against time; and, FIG. 6 is a diagrammatic representation of the voltage of a condenser dividing point of a rapidly increasing voltage circuit of the arc current control apparatus.

Operation of the arc current control device 15 occurs on flow of a portion of the alternating current supplied from the power source 12 to a step-down transformer 20 whereby the voltage is reduced and the resulting low voltage alternating current is transformed into a current having constant voltage by a constant voltage circuit shown at 21. This constant voltage current is fed to a voltage rapidly increasing circuit 22, the output voltage of the circuit 22 being increased rapidly from a low voltage $V_1$ to a high voltage $V_2$, the voltage being kept constant at the voltage $V_2$ after reaching this voltage level as is shown in FIG. 6.

The constant, relatively high output voltage $V_2$ is then supplied to an arc current instruction circuit 23, the phase of input signals into the gate of the thyristor 16 being controlled so as to delay the phase in order to decrease the output current of the arc power device 11 when the output voltage is low. The phase of the input signals is also controlled in order to increase the output current of the arc power device 11 as the output voltage increases. The constant voltage circuit 21 is seen to comprise a diode 24 a condenser 25, a resistance 26 and a constant voltage diode 27.

The voltage rapidly increasing circuit 22 is seen to comprise division condensers 28, 29 for adjusting the small current of an arc discharge initiation and division resistances 30, 31 for adjusting the large current of a steady arc discharge, the division condensers 28, 29 and division resistances 30, 31 being connected in parallel with the constant voltage circuit 21. The dividing point represented at 32 of the division condensers 28, 29 is connected to the dividing point 33 of the division resistances 30, 31 through a resistance 34. The dividing ratio of the condensers 28, 29 is taken to be smaller than that of the resistances 30, 31. The output voltage from the dividing point 32 of the circuit 22 is amplified by a transistor 35. A luminous diode 36 radiates and controls the resistance value of a photovariable resistance 37. Accordingly, by controlling resistance values of each amplifying circuit 39 with a phase changing circuit 38, the striking phase of the gate of the two thyristors 16 is controlled alternatively through the amplifying circuits 39 with the phase changing circuit 38. A portion of the input power supplied from the power source 12 is transformed into a trapezoidal current having a trapezoidal wave by trapezoidal current generating circuit 40, the trapezoidal current being supplied to the phase changing circuit 38. For each amplifying circuit 39, the alternating current having opposite polarity is supplied through transformer 41 from the power source. For variation in the load resistance in the arc discharge 4 or of the voltage of the power source 12, a compensating circuit 42 is connected between the dividing point 32 of the circuit 22 and the base of the transistor 35 of the arc current instruction circuit 23.

The compensating circuit 42 is comprised of a resistance 43 connected on the negative output line of the arc power device 11, the voltage resulting at this resistor 43 being supplied to a smoothing circuit 44 for elimination of pulsating components. Therefore, only direct current components are supplied to the output voltage from the condensor dividing point 33 so as to subtract in series.

As previously indicated, operation of the switch 9 to activate the arc starting device 10 and the arc power device 11 causes generation of the arc discharge 4 and the arc gap 14 between the electrode 13 and the casting material 3, the arc being first generated by the arc starting device 10 and maintained by the arc power device 11. The casting material 3 is thus completely melted and the arc discharge stops on melting of the casting material. The value of current supplied to the arc gap 14 by the arc power device 11 is controlled by the arc current control device 15 such that the current may increase rapidly, continuously, and smoothly from a small current $I_1$ to a large current $I_2$, the current $I_2$ being maintained on attainment of the current. The arc current control device 15 begins operation simultaneously with operation of the arc power device 11, thereby charging the constant voltage of the direct current to the division resistances 30, 31 and to the division condensors 28, 29. Thus, after the voltage of the dividing point 32 is amplified by the transistor 35, this voltage is charged to the gate of the thyristor 16 through the luminous diode 36, the photovariable resistance 37 and the arc current instruction circuit 23. The value of the current therefore supplied to the arc gap 14 is proportional to the voltage of the dividing point 32. As the dividing ratio of the division condensors 28, 29 is smaller than that of the division resistances 30, 31 initially, the voltage of the dividing point 32 is a small value $V_1$ and is smaller than that of the dividing point 33. However, the dividing point 32 is charged from the dividing point 33 through the resistance 34 to cause the voltage of the dividing point 32 to be increased rapidly and smoothly to a large value $V_2$ which is similar to the dividing point 33. The striking phase of the thyristor 16 is thus advanced in proportion to the value of the voltage of the dividing point 32. Accordingly, the current charged in the arc gap 14 is rapidly and smoothly increased from a small value $I_1$ to a steady larger value $I_2$ and the current is then maintained at a level equal to $I_2$.

The invention is thus seen to provide a method and apparatus for initiating an arc discharge for melting casting material at an initial arc current level which is lower than the steady state current normally used for arc melting, thereby to prevent starting shock. The invention provides for subsequently increasing current level in a rapid and smooth manner to a higher current level for full melting of the material which is to be cast. While the invention is described in detail relative to a particular embodiment thereof, it is to be understood that the invention can be practiced other than is explicitly illustrated without departing from the scope of the invention as defined by the appended claims.

What is claimed is:

1. In a method for arc discharge melting of a material to be cast in a precision casting apparatus, wherein the casting material is disposed in surmounting relation to a melting pot of the apparatus and an electrode is located opposite said casting material, an arc discharge being generated in an arc gap between said casting material and said electrode by means of charging the arc gap with an arc power device to melt the casting material with said arc discharge, the improvement comprising:
controlling the current charged to the arc gap to cause the current to be relatively small at initiation of the arc discharge; and,
increasing the current to the arc gap rapidly and smoothly to a relatively larger steady current value.

2. In the method of claim 1 and further comprising the step of maintaining the current at the relatively larger steady current value to melt the casting material.

3. In an arc melting apparatus for melting a material which is to be cast in a precision casting apparatus wherein the casting material is disposed in surmounting relation to a melting pot of the precision casting apparatus and an electrode is located opposite said casting material, the arc melting apparatus including an arc power device for generating an arc discharge in an arc gap between the casting material and the electrode to melt the casting material, the improvements comprising:
(a) arc current control means operatively associated with the arc melting apparatus for controlling the current charged to the arc gap, the arc current control means acting to cause the current applied to the arc gap to be relatively low at initiation of the arc discharge and acting to subsequently increase the current to the arc gap in a rapid and regular rate to a relatively large or steady current value at which the current is maintained to melt the casting material, the arc current control means comprising:

(i) a constant voltage circuit;
(ii) a circuit for rapidly increasing voltage; and,
(iii) an arc current instruction circuit connected to the constant voltage circuit through the circuit for rapidly increasing voltage including at least one division condensor for effecting the relatively low arc discharge initiation current and at least one division resistance for effecting the relatively larger steady current value, the division condensor and the division resistance being connected in parallel with the constant voltage circuit, the dividing ratio of the division condensor being taken to be smaller than the dividing ratio of the division resistance, the dividing point of said division resistance being connected with the dividing point of said division condensor through a resistance, said arc current instruction circuit being connected with said dividing point of said division condensor; and, (b) the arc power device having a thyristor interconnected between an alternating power source and a step-down transfer, the output of the step-down transformer connected to a rectification circuit to transform the current into a direct current which is applied to the arc gap, a gate of the thyristor being connected to the arc current instruction circuit.

4. In the apparatus of claim 3 and further comprising a compensating circuit for varying the load resistance of the arc discharge, the compensating circuit being provided between the dividing point of the division condensor and the arc current instruction circuit.

5. In the apparatus of claim 4 wherein the arc current instruction circuit includes means for controlling the resistance value of a photovariable resistance by means of a luminous diode charged with the voltage generated by amplifying the output voltage from the dividing point of the division condensor.

6. In the apparatus of claim 3 wherein the arc current instruction circuit includes means for controlling the resistance value of a photovariable resistance by means of a luminous diode charged from the voltage generated by amplifying the output voltage from the dividing point of the division condensor.

* * * * *

UNITED STATES PATENT AND TRADEMARK OFFICE
CERTIFICATE OF CORRECTION

PATENT NO. : 4,465,119
DATED : August 14, 1984
INVENTOR(S) : KIDOWAKI et al.

It is certified that error appears in the above-identified patent and that said Letters Patent is hereby corrected as shown below:

On the title page;
The "Name of Assignee" should read:

-- IWATANI SANGYO KABUSHIKI KAISHA --;

The "Address of the Assignee" should read:

-- Osaka, Japan --;

The "Name of the Patent Attorneys, Agent or Firm" should read:

-- BACON & THOMAS --.

Signed and Sealed this

Thirteenth Day of August 1985

[SEAL]

*Attest:*

DONALD J. QUIGG

*Attesting Officer*       *Acting Commissioner of Patents and Trademarks*